Figure 1:
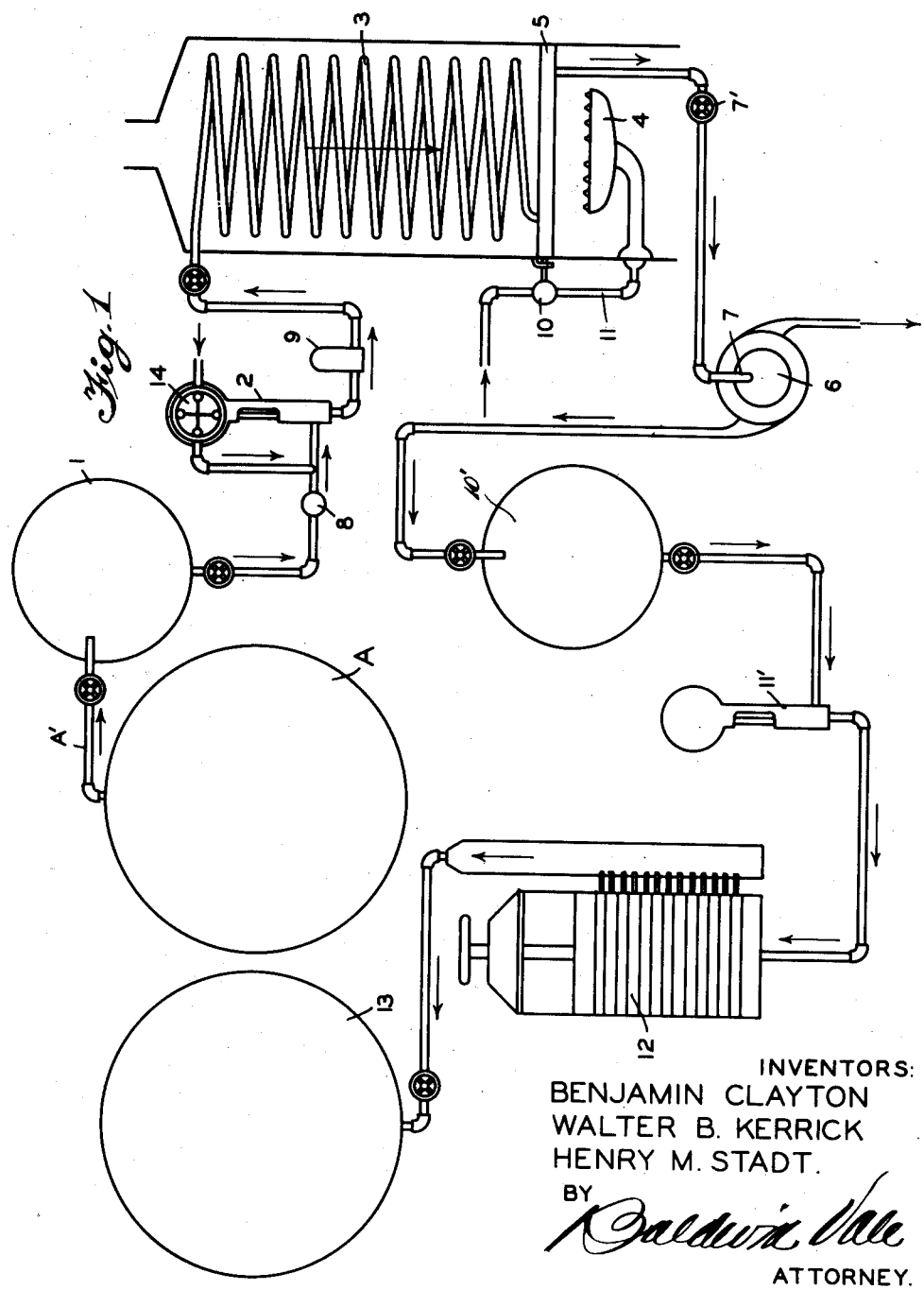

Nov. 23, 1937.    B. CLAYTON ET AL    2,100,274
PROCESS FOR REFINING OILS
Filed May 2, 1931    2 Sheets-Sheet 1

INVENTORS:
BENJAMIN CLAYTON
WALTER B. KERRICK
HENRY M. STADT.
BY
*Baldwin Vale*
ATTORNEY.

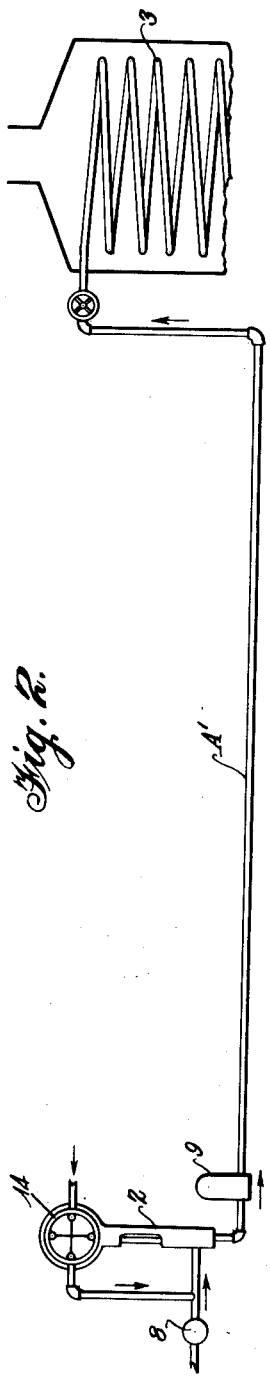

Patented Nov. 23, 1937

2,100,274

UNITED STATES PATENT OFFICE 2,100,274

PROCESS FOR REFINING OILS

Benjamin Clayton, Houston, Tex., Walter B. Kerrick, Los Angeles, and Henry M. Stadt, Glendale, Calif., assignors, by direct and mesne assignments, to Refining, Inc., Reno, Nev., a corporation of Nevada Application May 2, 1931, Serial No. 534,533

40 Claims. (Cl. 87—12)

This invention relates to an improved process for refining oils, and more particularly vegetable, animal, and certain other oils capable of separation and refining.

The principal object of the invention is to reduce the time period in the separation of the various constitucnts of oils, such as the "foots" from cottonseed and similar oils.

Another object is to more completely recover the more valuable constituents.

Another object is to promote the maximal separation by the addition of the minimal quantity of chemical reagents.

Another object is to minimize the conversion or transformation of the natural constituents of the oil by prolonged internal reactions.

Another object is to conserve all of the colloidal values in the oil in removing the solids therefrom.

Another object is to preserve and clarify the natural colors, flavors, odors, and other values desirable in commercial oil cuts or separations.

Another object is to avoid oxidation, fermentation, decomposition and other natural reactions incidental to the prolonged and involved processes heretofore practiced in this art.

Another object is to isolate and remove certain constituents present in some edible oils, such as the red coloring matter in cottonseed oil.

The above and other valuable results are largely due to the fact that expressed seed oils can be taken immediately from the press and the whole process of refining completed in a few minutes, before chemical reactions and decomposition set in; in contradistinction to prior practices requiring longer periods of hours or even days, in some instances.

Other objects and advantages will appear as the description progresses.

In this specification and the accompanying diagram the invention is disclosed in its preferred form. It is to be understood, however, that it is not limited to this form because it may be practiced in other forms within the purview of the claims following the description.

The following disclosure will relate particularly to the treatment of expressed cottonseed oil, which teaching will guide those skilled in the art in treating other substances, without departing from the spirit of the invention.

The whole oil as it comes from the press contains hulls, linters, nitrogenous non-fatty materials such as gums, and the like. The soluble gums, albuminous and other impurities are not truly water solvent, but they imbibe or absorb water and swell, forming a glutinous sludge in the separator.

A desirable solution consists of about twelve percent (12%) of caustic soda in water, of which about one percent to two percent (1% to 2%) is added to the oil by volume for California cottonseed oil.

Figure 1 of the drawings diagrammatically shows a schematic apparatus useful in the practice of this invention, wherein the whole oil is pumped from the drip tank A, through the pipe A' to the mixing tank 1 and Fig. 2 is a fragmentary view similar to Fig. 1 showing an apparatus suitable for carrying on a modified process.

In the first step the reagent, such as alkali in solution, is mixed with the oil in the tank 1, from whence it is pumped into the descending coils 3 by the pump 2 in step two. These coils are properly enclosed above the burner 4. From the coils the oil passes through the thermostatic unit 5, after which it is jetted into the centrifuge 6, through the calibrated nozzle 7 in step three. The valve 7' is introduced into the flow line to manually regulate the amount of back pressure in the coils 3.

The back pressure at the nozzle reacts in the coils against the check valve 8 at the pump, to maintain the predetermined pressure on the oil.

If a pulsating pump is used at 2, it is advisable to insert the air chamber 9 in the line to absorb the pulsations.

The oil passing through the thermostatic unit 5, controls the heat generated at 4, by controlling the throttle valve 10 controlling the fuel passing through the pipe 11, to the burner 4.

In this connection attention is directed to the copending applications in the name of Walter B. Kerrick, Filed November 14, 1930, Serial Number 495,636, Entitled Fluid Heater, and Method of Treating Liquids, Serial Number 495,634. These applications relate to the means and the method of treating colloids in the presence of alkali to accomplish a high state of hydrolysis.

In the practice of the present process it is important that in the coils 3 the oil and alkali be maintained in as constant volume or body as may be. That is, there should be no formation of vapors, foaming, or sudden or uneven expansion of the mixture within the apparatus.

It is advisable, therefore, to thus treat the oil by a continuous process in small active quantities rather than to attempt such fine degrees of regulation in larger "batches".

To that end it is important to calibrate the capacity of the discharge orifice of the nozzle 7, with respect to the measured input of the pump 2, so that the static pressure and constant volume may be maintained in the coils 3, while the dynamic pressure is increased by the application of heat.

It is desirable in the second step that the solution flow downwardly toward the source of heat so that the temperature of the solution progressively rises toward the discharge 7, from the heater.

It is important that the volume of heat be automatically regulated by the temperature of the solution. The maintained temperature of the oil can be manually or thermostatically controlled at 5.

There should be maintained coordination between the constant volume of input, output and the volume of heat applied to maintain the desired pressure in the coils 3. This will establish the proper velocity and turbulence of the oil within the coils, to insure the finest division of the alkali and diffusion of the alkaline solution within the oil. This is assisted by the progressively rising dynamic pressure, due to the thermal expansion of the oil, which causes an increased interstitial penetration and improved distribution of the alkali. Every molecule or globule of oil is acted upon by the solution and the inter reactions are complete, as proved in the resultant product.

In the present invention the quantity of alkali is so minute that saponification is greatly reduced and the free oil is not attacked by the alkali.

The third step is completed by jetting the atomized oil mixture into the centrifuge 6, at atmospheric pressure, with an instant drop in temperature. Centrifuging this hydrolized oil from the heater removes the "foots" or "soap stock" resulting from the alkali treatment accomplished in the coils.

The fourth step consists of clarifying and bleaching the processed oil in the agitating tank 10', by the addition of clays or in any other conventional manner.

The fifth step is to pump the clarified oil by means of the pump 11', through the conventional filter press 12. The filtered oil drains from the filter press into the tank 13. The ultimate edible product is a clear, pure, light colored stock, practically free from the deleterious red color, with the natural flavor preserved.

In some of the methods heretofore practiced the whole oil is agitated at high temperature (145° F.) open to the atmosphere, for long periods, about 45 minutes, in the presence of an excess of alkali; then it often stands for days to permit separation by precipitation. The oil and soap stock are so long in contact during the settling of the oils, that decomposition sets in and new free fatty acids formed, defeating the purpose intended. The agitation also causes undesirable emulsification.

In the present instance the small quantity of alkali leaves scarcely a trace in the ultimate product, which is at no time subjected to a temperature greater than 100° F. at about 100 pounds pressure. The few minutes required to complete the process avoids decomposition, rancidity, or any deleterious inter-reactions. The oil is completely dehydrated by step three, which reduces the catalytic-like effect in the deterioration of the oils, disfavors the production of free fatty acids which give rise to rancid flavors, odors and the accompanying bacterial reactions.

The present process can be simplified and speeded up by accomplishing step one by injecting the alkali or alkaline solution into the flowing stream of oil from the tank A. This is done by introducing the reagent meter 14 into the oil line A'. If it is installed at the pump 2 as shown, it can be geared thereto and the quantity of alkali solution synchronized with the quantity of oil measured by the pump 2. It is obvious, however, if, as shown in Fig. 2, the alkali is introduced closer to the oil supply A, which may be remote from the heater 3, premixing with the oil will take place in the pipe A' before reaching the heater 3 and step two.

In this shorter process the "foots" and other heavier constituents comprising the whole oil are put through "step two" in the heater 3 without oxidation or atmospheric reactions. The nozzle 7 is discharged into the centrifuge to accomplish "step three". Thus, the modified process is truly continuous from the extractor at A to the centrifuge 12.

The reagent thus pumped into the line A' in measured quantity, enters the oil in filamentary form and performs its previously described reactions during step two. The ultimate result is the same in both instances. The particular advantage of the shorter process is that the whole separation can be accomplished in a few minutes after the oil leaves the seeds in the conventional pressing or extracting operation, as at the drip tank A. There may be certain oils, however, that are more adaptable to the shorter process.

The shorter process has the added advantage that the latent heat, acquired in the pressing and extracting operations, facilitates the rise in temperature transferred in the heater 3. This is a desirable economy and is superior to reheating the raw oil after it has chilled. Another advantage of the shorter process, which is carried on under plus pressure, is that the separated oil emerges from the heater 3, thoroughly sterilized.

The foots, etc. removed by centrifuge in step three show practically no free oil and are more easily divided into their constituent gums, resins and inert suspended matter, than when the whole oil is treated by any other process heretofore practiced, so far as we are aware.

It is to be taken into consideration that certain substances having alkaline reactions can be treated by this process with an acid reagent. It is also a fact that in occasional instances refining separations can be accomplished without any reagents.

The exact procedure and reagents consistent in the practice of this invention can be varied to process various oils, depending upon their natures and the form of ultimate product desired, without departing from the spirit of the invention.

From the above, it will appear that our process involves the mixing of proportioned quantities of the oil to be refined and a reagent of the type set forth which is capable of combining with impurities in the oil to form soap stock. Thereafter, the soap stock is separated from the neutral oil. If centrifugal separation is employed, it is found that practically all the impurities are separated from the oil while therein but, in some cases, the subsequent equipment, including the filter press, may be used to remove the last traces of impurities from the oil.

It is desirable that the mixture of oil and soap stock be conditioned for this separation by the presence of a temperature facilitating this separation and by the maintenance of the soap stock uniformly distributed in the oil so that the mixture reaching the separator, a centrifuge in the hereinbefore example, will be uniform from time to time. It is known that, when such an oil and refining reagent are mixed in batches, an emulsion will form and that heat will assist in breaking this emulsion preparatory to separation. In the present invention, this phenomenon may be adapted to a continuous process in which the mixing is effected in a brief period and in which the reagent is in contact with the oil for such a brief period as to minimize saponification of the neutral oil, and this conditioning will desirably involve the presence of an emulsion-breaking temperature at the time of separation. When operating on those California cottonseed oils mentioned in the examples hereinbefore set forth, we have found it unnecessary to use temperatures in excess of 100° F. The elongated passage formed by the pipe of the heater 3 is very valuable in producing these and other conditioning effects.

If the reagent meter 14 is geared to the pump 2, as above-described, the reagent will be introduced into a stream of the oil at a rate proportional to the amount of oil pumped so that definite proportions of the oil and reagent are mixed. The proportion of such reagent needed to neutralize the fatty acid and complete the refining of the oil can be readily determined by any chemist skilled in the refining of such oils, or can be determined by trial. It is not desirable to use reagent in quantities much in excess of those necessary to refine the oil, thereby avoiding unnecessary action of the reagent on the oil itself.

Having thus described this invention what is claimed and desired to secure by Letters Patent is:

1. In the purification of vegetable and animal oils containing free fatty acid, a continuous process comprising intimately mixing a measured quantity of oil with a measured quantity of alkali for a period of less than five minutes, thereafter passing the mixture continuously through a heated conduit to raise its temperature to a degree which will facilitate centrifugal separation and then promptly centrifugally separating the refined oil from the resulting sludge and residual solution.

2. In the purification of vegetable and animal oils containing free fatty acid, a continuous process comprising intimately mixing a measured quantity of oil with a measured quantity of alkali for a brief period, thereafter passing the mixture continuously through a heated conduit to raise its temperature to a degree which will facilitate centrifugal separation and then promptly centrifugally separating the refined oil from the resulting sludge and residual solution.

3. A process for the purification of vegetable and animal oil containing free fatty acid, comprising continuously feeding in measured quantities separate streams of said oil and an alkali to a mixing zone, continuously advancing said oil and alkali while in intimate physical contact through said mixing zone to effect a thorough admixture thereof, in passing the mixture discharging from the mixing zone as a continuously advancing stream restricted in cross section through a continuous elongated passageway, in raising the temperature of the mixture during its passage through said elongated passageway to a degree sufficient to facilitate its subsequent centrifugal separation, and in subjecting the mixture discharging from said passageway to centrifugal separation to separate the refined oil from resulting sludge and residual solution.

4. A continuous process of refining crude vegetable and animal oils which contain free fatty acid, which comprises: adding to said crude oil a reagent capable of reacting with said fatty acid to produce foots, the amount of reagent so added being so proportioned that sufficient reagent is added to the crude oil to completely neutralize said fatty acid, without adding reagent to an amount considerably in excess of the amount necessary for said neutralization; causing the mixture resulting from said addition of reagent to the oil to advance through a conduit where the reagent reacts with the fatty acid to produce foots; continuously advancing a stream of the liquid resulting from the combination of said reagent with the crude oil through an elongated heating zone where the temperature of the advancing stream is progressively raised and in which zone the reaction of said reagent with the fatty acid is completed; and subjecting said liquid after said heating is completed to a separating action by which refined oil is separated from said foots.

5. A continuous process of refining crude vegetable and animal oils which contain free fatty acid, which comprises: adding to a flowing stream of said crude oil, a flowing stream of a reagent capable of reacting with said fatty acid to produce foots, said streams being so proportioned that sufficient reagent is added to the crude oil to completely neutralize said fatty acid, without adding reagent to an amount considerably in excess of the amount necessary for said neutralization; causing the mixture resulting from said addition of reagent to the oil to flow through a conduit in which the reagent reacts with the fatty acid to produce foots; continuously advancing a stream of the liquid resulting from the combination of said reagent with the crude oil through an elongated heating zone where the temperature of the advancing stream is progressively raised and in which zone the reaction of said reagent with the fatty acid is completed.

6. In the purification of vegetable and animal oils containing free fatty acid, a quick continuous process comprising mixing measured quantities of oil and alkali for a brief period to effect substantial neutralization of the free fatty acid contained in the oil and to form soap stock, thereafter promptly centrifugally separating the neutral oil from the soap stock, the process being characterized by limiting the time of contact of the alkali and oil to such a brief period as to minimize saponification of the neutral oil and by the mixture of soap stock and oil having an emulsion breaking temperature at the time of undergoing centrifugal separation whereby to condition the mixture for separation of the soap stock from the oil.

7. In the purification of vegetable and animal oils containing free fatty acid, a quick continuous process comprising mixing measured quantities of oil and alkali for a brief period to effect substantial neutralization of a free fatty acid contained in the oil and to form soap stock, thereafter promptly centrifugally separating the neutral oil from the soap stock, the process being characterized by limiting the time of contact of the alkali and oil to such a brief period as to minimize saponification of the neutral oil and by the temperature of the mixture of soap stock and oil having an emulsion breaking temperature not substantially less than 100° F. while undergoing centrifugal separation whereby to condition the mixture for the separation of the soap stock from the oil.

8. In the purification of vegetable and animal oils containing free fatty acid, a quick continuous process comprising mixing measured quantities of oil and alkali for a brief period in a zone substantially closed from the atmosphere to effect substantial neutralization of the free fatty acid contained in the oil and to form soap stock, thereafter promptly centrifugally separating the neutral oil from the soap stock, the process being characterized by limiting the time of contact of the alkali and oil to such a brief period as to minimize saponification of the neutral oil and by the mixture of soap stock and oil having an emulsion breaking temperature at the time of undergoing centrifugal separation whereby to condition the mixture for separation of the soap stock from the oil.

9. In the purification of vegetable and animal oils containing free fatty acid, a quick continuous process comprising mixing measured quantities of oil and alkali for a brief period to effect substantial neutralization of the free fatty acid contained in the oil and to form soap stock, thereafter advancing the mixture to a centrifugal separator while maintaining the same in a state of movement sufficient to cause the soap stock to be in such a degree of diffusion as to promote substantially uniform separation, promptly centrifugally separating the neutral oil from said soap stock, the process being characterized by limiting the time of contact of the alkali and oil to such a brief period as to minimize the saponification of the neutral oil and by the mixture of soap stock and oil having an emulsion breaking temperature at the time of undergoing centrifugal separation whereby to condition the mixture for separation of the soap stock from the oil.

10. In the purification of vegetable and animal oils containing free fatty acid, a quick continuous process comprising the steps of pumping together relatively small metered streams of oil and alkali in substantially constant, pre-determined proportions, mixing said streams for a brief period to effect substantial neutralization of the free fatty acid contained in the oil and to form soap stock while excluding substantial quantities of air, promptly advancing the mixture by pump pressure to a centrifugal separator for the prompt separation of the neutral oil from the soap stock, the process being characterized by limiting the time of contact of the alkali and oil to such a brief period as to minimize saponification of the neutral oil and by the mixture of soap stock and oil having an emulsion breaking temperature at the time of undergoing centrifugal separation whereby to condition the mixture for separation of the soap stock from the oil.

11. In the purification of vegetable and animal oils containing free fatty acid, a quick continuous process comprising mixing measured quantities of oil and alkali for a brief period to effect substantial neutralization of the free fatty acid contained in the oil and to form soap stock, thereafter promptly separating the neutral oil from the soap stock, the process being characterized by limiting the time of contact of the alkali and oil to such a brief period as to minimize saponification of the neutral oil and by the mixture of soap stock and oil having an emulsion breaking temperature at the time of undergoing separation whereby to condition the mixture for separation of the soap stock from the oil, said process being further characterized by being carried out in a single operation and during the continuous movement of the materials.

12. In the purification of vegetable and animal oils containing free fatty acid, a quick continuous process comprising mixing small metered quantities of oil and alkali for a brief period to effect substantial neutralization of the free fatty acid contained in the oil and to form soap stock, advancing the mixture of soap stock and oil to a centrifugal separator under super-atmospheric pressure, promptly separating the oil from the soap stock by centrifugal separation in said centrifugal while the mixture of soap stock and oil has an emulsion breaking temperature, said process being characterized by correlating the rate of flow and volume of said mixture so that the time of contact of the alkali and heated oil is limited to such a brief period as to minimize saponification of the neutral oil.

13. In the purification of vegetable and animal oils containing free fatty acid and color impurities, a quick continuous process comprising pumping small metered quantities of oil and alkali through a mixing zone, mixing said oil and alkali in said zone for a brief period to effect substantial neutralization of the free fatty acid contained in the oil and to form soap stock and conditioning the mixture by the presence of an emulsion breaking temperature for the step of centrifugal separation, advancing the thus conditioned mixture by pressure imposed by said pumping to a centrifugal separator and maintaining the mixture in a state of movement during the advancement thereof to prevent substantial stratification of the mixture while providing sufficient time for color reduction, maintaining the materials in said process out of contact with the atmosphere from the point of entrance into said process to the centrifugal separator, promptly centrifugally separating the neutral oil from the soap stock, the time of contact of the alkali and oil being limited to such a brief period as to minimize saponification of the neutral oil and the mixture of soap stock and oil having said emulsion breaking temperature at the time of undergoing centrifugal separation.

14. In the purification of vegetable and animal oils containing free fatty acid, a quick continuous process comprising mixing relatively small metered quantities of oil and alkali for a brief period to effect substantial neutralization of the free fatty acids contained in the oil and to form soap stock and conditioning the mixture for centrifugal separation by the presence of heat in an amount sufficient to cause the temperature to be materially in excess of the solidification point of the oil, advancing the thus conditioned mixture to a centrifugal separator under super-atmospheric pressure and maintaining the mixture in a state of movement during the advancement thereof to prevent substantial stratification of the mixture while providing sufficient time for color reduction, promptly separating the neutral oil from the soap stock, the process being characterized by limiting the time of contact of the alkali and oil to such a brief period as to minimize saponification of the neutral oil and by the mixture of soap stock and oil having an emulsion breaking temperature at the time of undergoing centrifugal separation whereby to condition the mixture for separation of the soap stock from the oil.

15. In the purification of vegetable and animal oils containing free fatty acid and color impurities, a quick continuous process comprising mixing relatively small metered quantities of oil and alkali for a brief period to effect substantial neutralization of the free fatty acid contained in the oil and to form soap stock and conditioning the mixture for the step of centrifugal separation by the presence of an emulsion breaking temperature, advancing the thus conditioned mixture to a centrifugal separator under superatmospheric pressure and maintaining the mixture in a state of movement during the advancement thereof to prevent substantial stratification of the mixture while providing sufficient time for color reduction, promptly separating the neutral oil from the soap stock, the process being characterized by limiting the time of contact of the alkali and oil to such a brief period as to minimize saponification of the neutral oil and by the mixture of soap stock and oil having an emulsion breaking temperature at the time of undergoing centrifugal separation whereby to condition the mixture for separation of the soap stock from the oil.

16. In the purification of vegetable and animal oils containing free fatty acid, a quick continuous process comprising mixing measured quantities of oil and alkali at an emulsion breaking temperature whereby to disfavor the formation of an emulsion during said mixing while effecting substantial neutralization of the free fatty acid contained in the oil and the formation of soap stock, thereafter promptly centrifugally separating the neutral oil from the soap stock, the process being characterized by limiting the time of contact of the alkali and oil to such a brief period as to minimize saponification of the neutral oil and by the mixture of soap stock and oil having an emulsion breaking temperature at the time of undergoing centrifugal separation.

17. In the purification of vegetable and animal oils containing free fatty acid and color impurities, a quick continuous process comprising mixing measured quantities of oil and alkali at an emulsion breaking temperature for a brief period to effect substantial neutralization of the free fatty acid contained in the oil and to form soap stock, thereafter promptly separating the neutral oil from the soap stock by a centrifugal separator, the process being characterized by limiting the time of contact of the alkali and oil to such a brief period as to minimize saponification of the neutral oil and by the mixture of soap stock and oil having an emulsion breaking temperature at the time of undergoing centrifugal separation whereby to condition the mixture for separation of the soap stock from the oil.

18. In the purification of vegetable and animal oils containing free fatty acid, a quick continuous process comprising the steps of pumping together relatively small metered streams of oil and alkali in substantially constant, predetermined proportions and mixing the same for a brief period to effect substantial neutralization of the free fatty acid contained in the oil and to form soap stock, advancing the mixture to a centrifugal separator by pump pressure and maintaining it in a state of movement during such advancement to prevent stratification of the mixture, promptly centrifugally separating the neutral oil from the soap stock while the mixture of soap stock and oil is at an emulsion breaking temperature, maintaining the materials being processed out of contact with the atmosphere from the point of entrance into the process to the centrifugal separator, and limiting the time of contact of the alkali and oil to such a brief period as to minimize saponification of the neutral oil.

19. In the purification of vegetable and animal oils containing free fatty acid and coloring impurities, a quick continuous process comprising mixing small measured quantities of oil and alkali for a brief period at an emulsion breaking temperature to effect substantial neutralization of the free fatty acid contained in the oil and to form soap stock, thereafter promptly separating the neutral oil from the soap stock by a centrifugal separator while the mixture is at said emulsion breaking temperature, limiting the time of contact of the alkali and oil to such a brief period as to minimize saponification of the neutral oil, the process being further characterized by imparting heat to such small quantities of oil when in a state of movement and by maintaining the oil in a heated condition for such a brief period as to minimize deterioration thereof.

20. In the purification of vegetable and animal oils containing free fatty acid, a quick continuous process comprising mixing measured quantities of oil and alkali for a brief period to effect substantial neutralization of the free fatty acid contained in the oil and to form soap stock, thereafter promptly centrifugally separating the neutral oil from the soap stock and other impurities to produce an oil containing only slight traces of residual impurities and promptly separating the residual impurities from the neutral oil, limiting the time of contact of the alkali and oil to such a brief period as to minimize saponification of the neutral oil, the mixture of soap stock and oil having an emulsion breaking temperature at the time of undergoing centrifugal separation whereby to condition the mixture of soap stock and oil for centrifugal separation of the soap stock from the oil.

21. In the purification of vegetable and animal oils containing free fatty acid, a quick continuous process comprising mixing measured quantities of oil and a saponifying reagent for a brief period to effect reaction with the free fatty acid contained in the oil and to form soap stock, thereafter promptly separating the purified oil from the soap stock, the process being characterized by limiting the time of contact of the reagent and oil to such a brief period as to minimize reactions with the purified oil and by the mixture of soap stock and oil having an emulsion breaking temperature at the time of undergoing separation whereby to condition the mixture for the separation of the soap stock from the oil.

22. In the purification of vegetable and animal oils containing free fatty acid, a quick continuous process comprising mixing small quantities of oil and a saponifying reagent for a brief period to react with free fatty acid contained in the oil to form soap stock, rapidly conditioning the mixture of soap stock and oil for the step of separating it into its constituents with the aid of an emulsion breaking temperature to facilitate centrifugal separation of the soap stock from the purified oil and thereafter promptly centrifugally separating the purified oil from said soap stock while the mixture is at emulsion breaking temperature and limiting the time of contact of the oil and reagent to such a brief period as to minimize reaction with the purified oil.

23. In the purification of vegetable and animal oils containing free fatty acid, a quick process comprising mixing small quantities of oil and a saponifying reagent for a brief period to form soap stock, thereafter promptly centrifugally separating neutral oil from soap stock, limiting the time of contact of the saponifying reagent and the oil to such a brief period as to minimize saponification of neutral oil, the mixture of soap stock and oil being conditioned for centrifugal separation by the presence of a temperature at least as high as the emulsion breaking temperature for the mixture being treated while undergoing separation, whereby to insure against the existence of a difficultly separable emulsion during said separation.

24. In the purification of vegetable and animal oils containing free fatty acid and color impurities, a quick continuous process comprising mixing small quantities of oil and a saponifying reagent for a brief period to effect substantially complete neutralization of said fatty acids and to form soap stock, promptly conditioning said mixture for the step of centrifugal separation, by the employment of a temperature at least as high as the emulsion breaking temperature of said mixture, promptly advancing the thus conditioned mixture to a centrifugal separator while providing sufficient time for color reduction and promptly subjecting said mixture to centrifugal separation while at said emulsion breaking temperature.

25. In the purification of vegetable and animal oils containing free fatty acid, the steps comprising continuously flowing together a stream of the oil and a stream of aqueous alkaline solution to form a mixture of the oil and the solution, then passing the mixture continuously through a heated conduit thereby raising the temperature of the mixture to a degree sufficient to facilitate separation and maintaining the oil and solution in contact a sufficient length of time to effect neutralization of the free fatty acid in the oil, and then before substantial reaction of the solution with the neutral oil, continuously separating the neutral oil from the resulting sludge and residual solution.

26. In the purification of vegetable and animal oils containing free fatty acid, a quick continuous process comprising mixing measured quantities of oil and alkali for a brief period to effect substantial neutralization of the free fatty acid contained in the oil and to form an emulsion containing soap stock, thereafter promptly centrifugally separating the neutral oil from the soap stock, the process being characterized by limiting the time of contact of the alkali and oil to such a brief period as to minimize saponification of the neutral oil and by the mixture of soap stock and oil having an emulsion breaking temperature at the time of undergoing centrifugal separation whereby to condition the mixture for separation of the soap stock from the oil.

27. In the purification of vegetable and animal oils containing free fatty acid, a continuous process comprising mixing substantially constant predetermined quantities of oil and alkali for a brief period while preventing the entrance of substantial quantities of air, thereafter advancing the mixture under super-atmospheric pressure continuously through a heated conduit to raise its temperature to a degree which will facilitate centrifugal separation, and then promptly centrifugally separating the refined oil from the resulting sludge and residual solution.

28. In the purification of vegetable and animal oils containing free fatty acid, a process comprising mixing a small quantity of oil with a small quantity of alkali for a brief period, thereafter heating the mixture rapidly to a degree which will condition it for the step of separating it into its constituents and thereafter promptly centrifugally separating the refined oil from the resulting sludge and residual solution.

29. The process as defined in claim 28 in which relatively small quantities of the mixture are rapidly heated to condition the same for separation.

30. In the purification of vegetable and animal oils containing free fatty acid, a process comprising mixing a measured quantity of oil with a measured quantity of alkali for a brief period, thereafter heating the mixture to a degree which will condition it for the step of separating it into its constituents and thereafter centrifugally separating the refined oil from the resulting sludge and residual solution, the process being carried out during the continuous flow of the materials.

31. In the purification of vegetable oils containing free fatty acid, a process comprising mixing a measured quantity of oil with a measured quantity of alkali at a relatively low temperature and for a brief period, thereafter heating the mixture to a degree which will condition it for the step of separating it into its constituents and thereafter promptly centrifugally separating the refined oil from the resulting sludge and residual solution, the process being carried out during the continuous flow of the materials.

32. In the purification of vegetable oils containing free fatty acid, a process comprising intimately mixing a small quantity of oil with a small quantity of alkali for a period of less than five minutes, thereafter rapidly heating the mixture to a temperature which will condition it for the step of separating it into its constituents and thereafter promptly centrifugally separating the refined oil from the resulting sludge and residual solution.

33. In the purification of vegetable and animal oils containing free fatty acid, a process comprising intimately mixing a measured quantity of oil with a measured quantity of alkali for a brief period, promptly thereafter heating the mixture for a period not more than a few minutes and to a degree which will condition it for the step of separating it into its constituents and promptly thereafter centrifugally separating the refined oil from the resulting sludge and residual solution.

34. In the purification of vegetable and animal oils containing free fatty acid, a continuous process comprising mixing a measured quantity of oil with a measured quantity of alkali for a brief period while preventing the entrance of substantial quantities of air and the resultant formation of an undesirably stiff emulsion, thereafter passing the mixture continuously through a heated conduit to raise its temperature to a degree which will facilitate centrifugal separation and then promptly centrifugally separating the refined oil from the resulting sludge and residual solution.

35. In the purification of vegetable and animal oils containing free fatty acid, a process comprising mixing a measured quantity of oil with a measured quantity of alkali for a brief period in a zone closed from the atmosphere sufficient to avoid troublesome emulsions, thereafter heating the mixture to a degree which will condition it for the step of separating it into its constituents, and thereafter centrifugally separating the refined oil from the resulting sludge and residual solution, the process being carried out during the continuous flow of the materials.

36. In the purification of vegetable and animal oils containing free fatty acid, a process comprising mixing a small quantity of oil with a small quantity of alkali for a brief period and while substantially closed from the atmosphere, whereby to prevent the formation of an undesirably stiff emulsion, thereafter heating the mixture rapidly to a degree which will condition it for the step of separating it into its constituents and thereafter promptly centrifugally separating the refined oil from the resulting sludge and residual solution.

37. In the purification of vegetable and animal oils containing free fatty acid, a process comprising mixing a small quantity of oil with a small quantity of alkali for a brief period, thereafter heating the mixture rapidly to a degree which will condition it for the step of separating it into its constituents, thereafter promptly centrifugally separating the refined oil from the resulting sludge and residual solution, the mixing and heating steps being carried out in a system substantially closed from the atmosphere.

38. In a continuous process of purifying vegetable and animal oils containing free fatty acid and color impurities, the process comprising advancing small metered quantities of oil and alkali in constant pre-determined proportions to a mixing zone which is closed to prevent the entrance of such quantities of air as will produce a stiff emulsion, rapidly and thoroughly mixing said small metered quantities of oil and alkali to effect rapid and substantial neutralization of the free fatty acid by said alkali in said mixing zone to form soap stock, limiting the duration of the mixing to a period of less than five minutes to minimize saponification of neutral oil, continuously pumping the resultant mixture through an elongated conduit closed from the atmosphere, applying heat to the relatively small volume of said mixture advancing through said conduit at a rate sufficient to rapidly heat the same to such a temperature as will facilitate centrifugal separation, maintaining the mixture in said conduit in a condition of movement sufficient to prevent local over-heating and stratification of the soap stock formed in the mixing zone, limiting the duration of heating to such a relatively few minutes as to avoid excessive saponification of said neutral oil and promptly continuously delivering the thus conditioned mixture from the heating zone to a centrifugal separator and separating soap stock including coloring matter from the neutral oil therein.

39. In the purification of vegetable and animal oils containing free fatty acid, a process comprising mixing small measured quantities of oil and alkali in pre-determined, constant proportions, so as to effect rapid, substantial neutralization of the free fatty acid and the formation of soap stock, limiting the duration of the mixing of said materials for a period of less than five minutes to minimize saponification of neutral oil, pumping the resultant mixture through an elongated conduit, applying heat to a relatively small volume of the said mixture in said conduit at a rate sufficient to rapidly heat the same to a temperature which will facilitate centrifugal separation of said oil and soap stock, maintaining the mixture in a condition of movement sufficient to cause the soap stock to remain in substantially uniform distribution in the oil to prevent local over-heating, limiting the duration of heating to such a relatively few minutes as to avoid excessive saponification of the neutral oil, promptly thereafter subjecting the thus conditioned mixture to centrifugal separation to separate soap stock including color impurities from the neutral oil.

40. A process of purifying vegetable and animal oils containing free fatty acid comprising the steps of mixing measured quantities of oil and alkali to effect substantial neutralization of the free fatty acid contained in the oil and to form soap stock, thereafter continuously advancing a relatively small stream of the mixture through a heating zone, continuously and rapidly heating the stream as it passes through said zone to a temperature sufficient to facilitate centrifugal separation and promptly centrifugally separating the soap stock from the neutral oil.

BENJAMIN CLAYTON.
WALTER B. KERRICK.
HENRY M. STADT.